United States Patent
Parthasarathy et al.

(10) Patent No.: US 9,531,729 B2
(45) Date of Patent: Dec. 27, 2016

(54) PRIVATE DISCOVERY OF ELECTRONIC DEVICES

(71) Applicant: Apple Inc., Cupertino, CA (US)

(72) Inventors: Mohan Parthasarathy, Cupertino, CA (US); Terrin D. Eager, Cupertino, CA (US); Stuart D. Cheshire, San Jose, CA (US)

(73) Assignee: Apple Inc., Cupertino, CA (US)

( * ) Notice: Subject to any disclaimer, the term of this patent is extended or adjusted under 35 U.S.C. 154(b) by 68 days.

(21) Appl. No.: 14/183,244

(22) Filed: Feb. 18, 2014

(65) Prior Publication Data

US 2014/0244996 A1 Aug. 28, 2014

Related U.S. Application Data

(60) Provisional application No. 61/770,793, filed on Feb. 28, 2013.

(51) Int. Cl.
*H04L 9/32* (2006.01)
*H04L 29/06* (2006.01)
*H04L 29/08* (2006.01)

(52) U.S. Cl.
CPC ......... *H04L 63/104* (2013.01); *H04L 63/0428* (2013.01); *H04L 63/0876* (2013.01); *H04L 67/16* (2013.01)

(58) Field of Classification Search
CPC ...... H04W 48/14; H04W 8/245; H04W 60/00; H04W 48/20; G07F 7/08; G07F 7/12; G07F 7/122; G06F 11/00; G06F 11/006; G11B 20/00; G11B 20/00086; H04N 7/173; H04N 7/16; H04N 7/165; H04N 7/17318; H04N 21/231;H04N 21/2347; H04N 21/2543; H04N 21/25816; H04N 21/41407; H04N 21/42684; H04N 21/443; H04N 21/6405
USPC 713/150, 161, 165, 168, 160, 176; 370/310, 400; 455/41.2; 726/29; 348/E7.063, E7.071; 714/E11.019
See application file for complete search history.

(56) References Cited

U.S. PATENT DOCUMENTS

| | | | |
|---|---|---|---|
| 6,170,060 B1 * | 1/2001 | Mott | G06F 11/006 348/E7.063 |
| 7,539,150 B2 * | 5/2009 | Lauer | H04L 67/1097 370/254 |
| 7,616,594 B2 * | 11/2009 | Roberts | H04W 48/14 370/310 |
| 8,005,227 B1 * | 8/2011 | Linnell | H04L 9/083 380/277 |
| 2014/0075488 A1 * | 3/2014 | Christudass | H04L 41/5058 725/114 |

* cited by examiner

*Primary Examiner* — Thanhnga B Truong
(74) *Attorney, Agent, or Firm* — Sterne, Kessler, Goldstein & Fox P.L.L.C.

(57) ABSTRACT

The disclosed embodiments provide a system that facilitates communication between a first electronic device and a second electronic device. During operation, the system uses the first electronic device to create a discovery request comprising a first group identifier (ID) associated with the first electronic device, wherein using the first electronic device to create the discovery request involves encrypting the first group ID and including the encrypted first group ID in the discovery request. Next, the system transmits the discovery request to the second electronic device, wherein the discovery request is used by the second electronic device to generate a discovery response to the discovery request.

27 Claims, 7 Drawing Sheets

PRIVATE DISCOVERY OF ELECTRONIC DEVICES

RELATED APPLICATION

This application claims priority under 35 U.S.C. §119 to U.S. Provisional Application No. 61/770,793, entitled "Selective Discovery of Electronic Devices," and filed on 28 Feb. 2013, by Mohan Parthasarathy and Terrin D. Eager, the contents of which are herein incorporated by reference in their entirety.

BACKGROUND

Field

The disclosed embodiments relate to service discovery on electronic devices. More specifically, the disclosed embodiments relate to techniques for performing private discovery of electronic devices.

Related Art

Recent improvements in computing power and wireless networking technology have significantly increased the capabilities of electronic devices. For example, laptop computers, tablet computers, portable media players, smartphones, digital media receivers, video game consoles, and/or other modern computing devices are typically equipped with WiFi capabilities that allow the computing devices to retrieve webpages, stream audio and/or video, share desktops and/or user interfaces (UIs), and/or transfer files wirelessly among one another.

Such expansion of computing and networking capabilities has resulted in an increase in the computing and/or networking options available to users of the electronic devices. However, the abundance of options may increase overhead associated with discovery and/or selection of the options. For example, an electronic device may perform service discovery by querying other electronic devices on the same local network for one or more services offered by the other electronic devices. The electronic device may then receive a response from each electronic device that offers at least one of the queried services. As a result, the electronic device may be flooded with a large number of responses, only some of which may be interesting to the electronic device. In addition, processing of each response on the electronic device may consume processor, network, and/or battery resources on the electronic device and negatively impact use of the electronic device.

Hence, use of electronic devices may be facilitated by mechanisms for filtering options and/or reducing overhead associated with performing service discovery on the electronic devices.

SUMMARY

The disclosed embodiments provide a system that facilitates communication between a first electronic device and a second electronic device. During operation, the system uses the first electronic device to create a discovery request containing a first group identifier (ID) associated with the first electronic device, wherein using the first electronic device to create the discovery request involves encrypting the first group ID and including the encrypted first group ID in the discovery request. Next, the system transmits the discovery request to the second electronic device, wherein the discovery request is used by the second electronic device to generate a discovery response to the discovery request.

In some embodiments, the first group ID represents an entity owning the first electronic device.

In some embodiments, the system also receives the discovery response from the second electronic device. If the discovery response includes a second group ID associated with the second electronic device, the system verifies a match between the first and second group IDs. If the discovery response omits the second group ID, the system uses an application on the first electronic device to verify an association of the second electronic device with the first group ID. For example, the second group ID may be omitted from an unsolicited service advertisement from the second electronic device.

In some embodiments, the system also uses the second electronic device to receive the discovery request from the first electronic device. Next, the system determines an association of the second electronic device with the first group ID from the discovery request. If the association exists, the system creates the discovery response containing the first group ID and transmits the discovery response to the first electronic device. If the association does not exist, the system omits the discovery response to the first electronic device.

In some embodiments, determining the association of the second electronic device with the first group ID involves obtaining a second group ID associated with the second electronic device, and using a first hash function to calculate a first hash value from the second group ID. Parameters for the first hash function may be extracted from the discovery request. If the first hash value matches the encrypted first group ID, the association is verified. If the first hash value does not match the encrypted first group ID, a lack of the association is verified.

In some embodiments, creating the discovery response containing the first group ID involves at least one of:
  (i) adding a salt to the second group ID;
  (ii) using a second hash function to calculate a second hash value from the second group ID including the added salt; and
  (iii) including the second hash value in the discovery response.

In some embodiments, encrypting the first group ID involves adding a salt to the first group ID and then using a first hash function to calculate a first hash value from the first group ID including the added salt.

In some embodiments, using the first hash function to calculate the first hash value from the first group ID involves varying the first hash value based on a use of the first hash function by the first electronic device.

In some embodiments, verifying the match between the first and second group IDs involves using a second hash function to calculate a second hash value from the first group ID, and comparing the second hash value with the second group ID, wherein the second group ID is encrypted.

In some embodiments, the first group ID is associated with at least one of a user, a set of users, and an organization.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
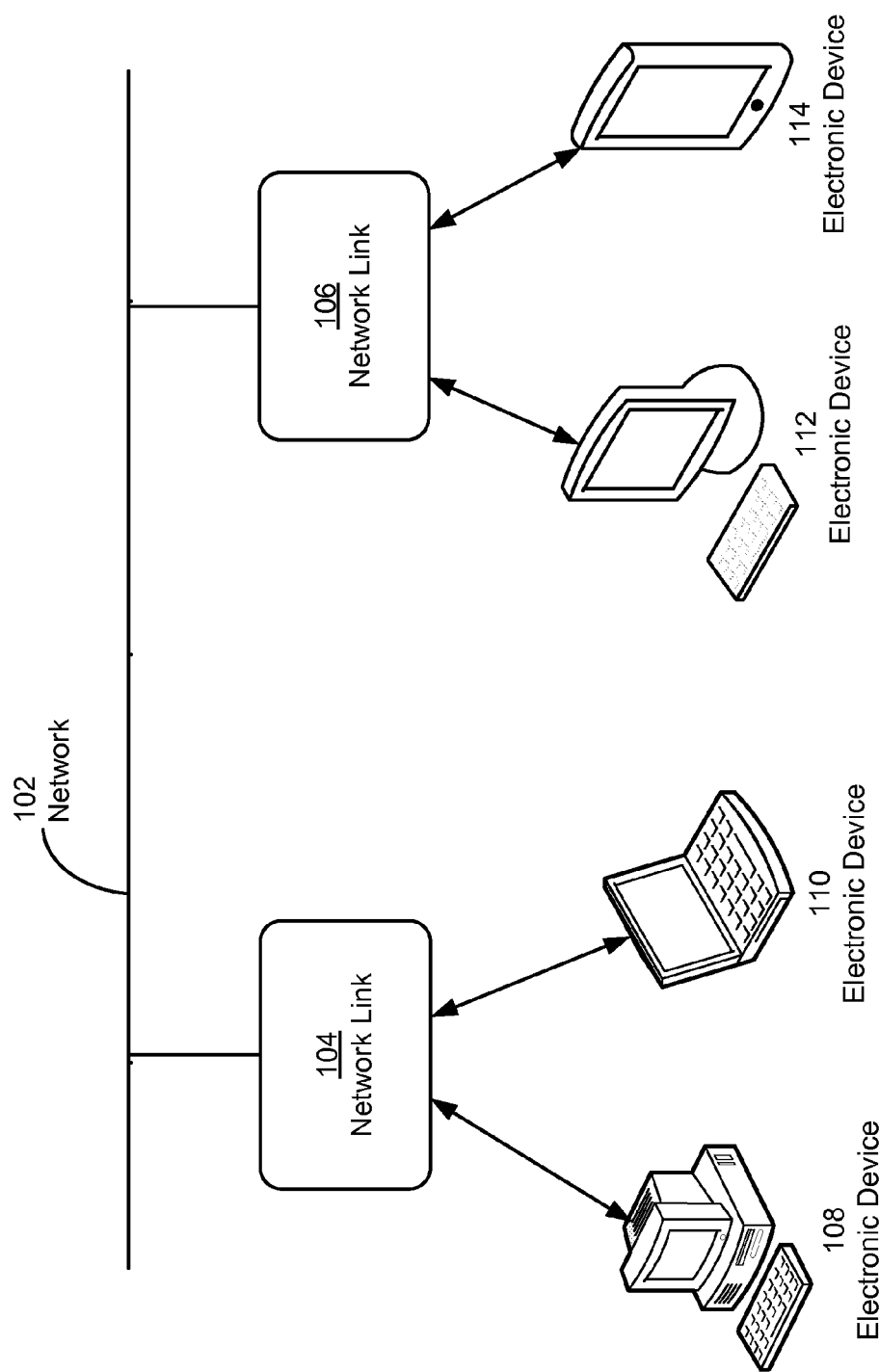
FIG. 1 shows a schematic of a system in accordance with the disclosed embodiments.

The disclosed embodiments provide a method and system for facilitating communication between electronic devices. As shown in FIG. 1, a number of electronic devices 108-114 are connected to a network 102 through network links 104-106 provided by devices such as wireless access points, cellular towers, and/or routers. Electronic devices 108-114 may include personal computers, laptop computers, tablet computers, mobile phones, portable media players, digital media receivers, video game consoles, printers, scanners, and/or other network-enabled electronic devices. Network 102 may include a local area network (LAN), wide area network (WAN), personal area network (PAN), virtual private network, intranet, mobile phone network (e.g., a cellular network), WiFi network, Ethernet network, and/or other type of network that facilitates communication among electronic devices (e.g., electronic devices 108-114) connected to network 102.

Electronic devices 108-114 may communicate with one another and/or with other electronic devices or servers through network 102. For example, electronic device 110 may use a discovery protocol such as Bonjour (Bonjour™ is a registered trademark of Apple Inc.) and/or Multicast Domain Name System (mDNS) to advertise services on electronic device 110 to electronic device 112 and/or other electronic devices on network 102. In turn, electronic device 112 may use the discovery protocol and network 102 to discover (e.g., detect) the services on electronic device 110. Finally, electronic device 112 may use the services by connecting to electronic device 110 through network 102 and accessing the services. For example, electronic device 112 may use the discovery protocol and network 102 to access services for transferring files, streaming media, printing, collaborating on documents, and/or sharing desktops on electronic device 110.

However, overhead associated with discovery of services on electronic devices 108-114 may increase with the number of electronic devices 108-114 on network 102. For example, a discovery request from one electronic device to discover one or more services on network 102 may result in discovery responses from thousands of other electronic devices if network 102 is a large LAN. During creation, transmission, and processing of the discovery responses, significant processor, network, and/or battery resources may be consumed by the querying electronic device and/or the responding electronic devices. In addition, the large number of responses may prevent a user of the querying electronic device from easily identifying a relevant subset of the responding electronic devices providing the service(s).

Figure 2:
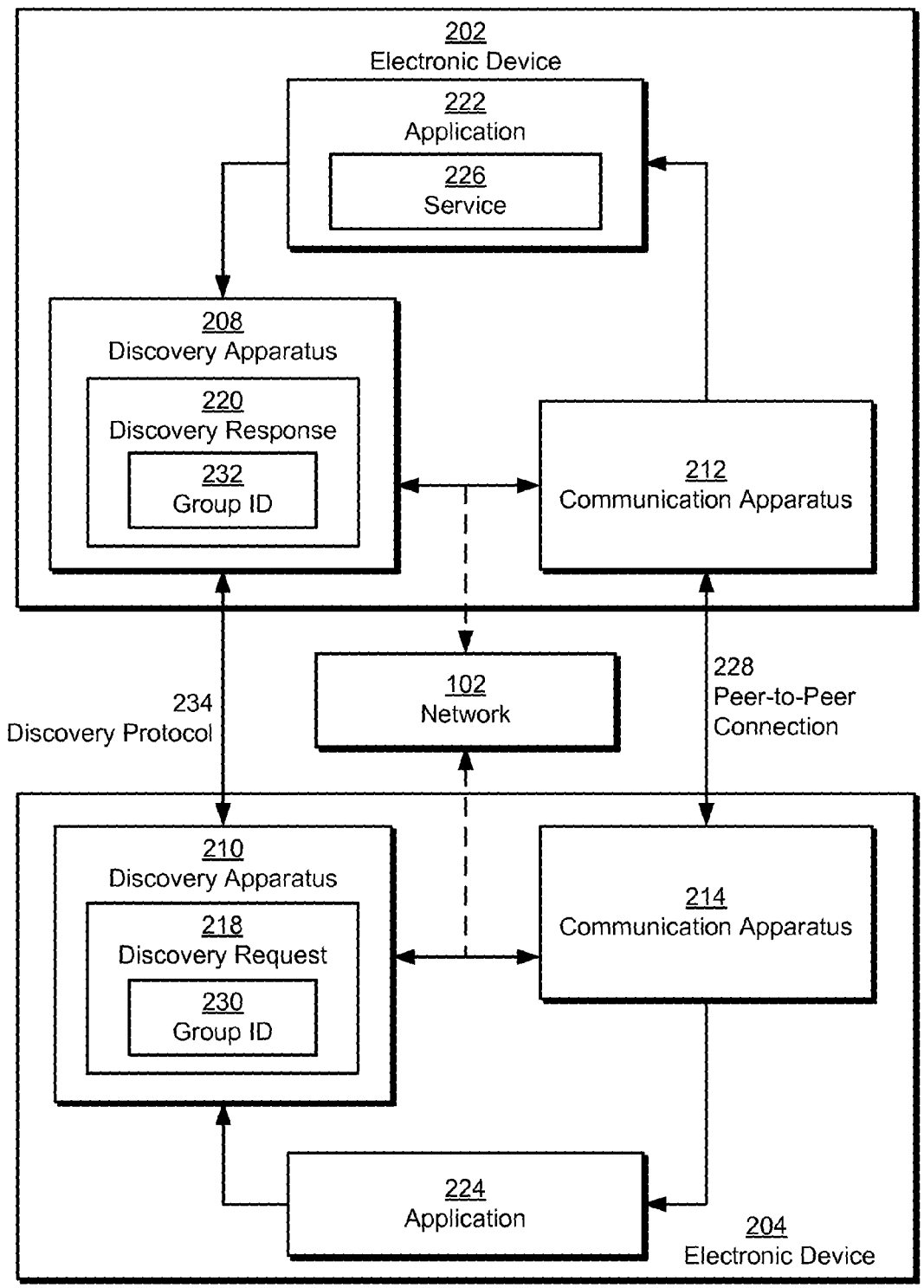
FIG. 2 shows a system for facilitating communication between a first electronic device and a second electronic device in accordance with the disclosed embodiments.

In one or more embodiments, electronic devices 108-114 include functionality to perform private discovery of services among one another. As shown in FIG. 2, a set of electronic devices 202-204 may be connected through network 102. To enable use of a service 226 provided by an application 222 on electronic device 202 by an application 224 on electronic device 204, electronic device 202 may advertise service 226 through a discovery protocol 234 such as Bonjour and/or mDNS. In turn, electronic device 204 may discover and use service 226 through discovery protocol 234.

More specifically, a discovery apparatus 208 on electronic device 202 may receive an advertising request for service 226 from application 222. In response to the advertising request, discovery apparatus 208 and/or a communication apparatus 212 on electronic device 202 may enable the detection of service 226 by other electronic devices (e.g., electronic device 204) in proximity to electronic device 202. For example, discovery apparatus 208 and/or communication apparatus 212 may publish service 226 by registering a link-local Internet Protocol (IP) address of electronic device 202 and a name of service 226 with network 102.

Next, a discovery apparatus 210 and/or a communication apparatus 214 on electronic device 204 may discover service 226 by transmitting a discovery request 218 for service 226 to nearby electronic devices, including electronic device 202. In response to discovery request 218, discovery apparatus 208 and/or communication apparatus 212 may generate a discovery response 220 to discovery request 218.

Discovery response 220 may include data associated with service 226. For example, discovery response 220 may include a service type for service 226, a unique name for service 226 and/or electronic device 202, and/or other information that allows electronic device 204 to sufficiently discover service 226. Discovery apparatus 208 and/or communication apparatus 212 may then complete discovery of service 226 by electronic device 204 by transmitting discovery response 220 to electronic device 204.

Once a service (e.g., service 226) is discovered by an electronic device (e.g., electronic device 204), the service may be used by the electronic device. For example, communication apparatus 214 may use the unique name for service 226 from discovery response 220 to perform a Domain Name System (DNS) lookup of the network address, port number, and/or other configuration information for accessing service 226 on electronic device 202. Alternatively, communication apparatus 214 may obtain the configuration information directly from discovery response 220. Communication apparatus 214 may subsequently use the configuration information to connect to electronic device 202 through network 102 and/or a peer-to-peer connection 228 with electronic device 202, and electronic device 204 may use service 226 through network 102 and/or peer-to-peer connection 228.

To reduce overhead associated with performing service discovery on network 102, electronic devices 202-204 may use one or more group identifiers (IDs) (e.g., group IDs 230-232) to filter the generation and/or transmission of discovery responses (e.g., discovery response 220) to discovery requests (e.g., discovery request 218). In particular, discovery apparatus 210 may include a first group ID 230 associated with electronic device 204 in discovery request 218. Group ID 230 may represent a user, a group of users, and/or an organization associated with electronic device 204. For example, group ID 230 may be a user ID and/or email address for a user of electronic device 204, a unique group name of a group of users authorized to use electronic device 204, a physical location associated with electronic device 204 and/or nearby electronic devices, and/or a unique organization name of an organization under which electronic device 204 is registered. In other words, group ID 230 may represent an entity (e.g., user, group, organization, etc.) owning electronic device 204. Alternatively, group ID 230 may identify other attributes associated with electronic device 204, such as the device type of electronic device 204 (e.g., mobile phone, tablet computer, personal computer, printer, display, etc.) and/or one or more services provided by electronic device 204.

Next, discovery apparatus 210 and/or communication apparatus 214 may transmit discovery request 218 to electronic device 202, and discovery apparatus 208 may generate or omit discovery response 220 based on the association of electronic device 202 with group ID 230. If an association between electronic device 202 and group ID 230 exists, discovery apparatus 208 and/or communication apparatus 212 may include a second group ID 232 indicating the association in discovery response 220 and transmit discovery response 220 to electronic device 204. For example, discovery apparatus 208 and/or communication apparatus 212 may provide discovery response 220 if electronic device 202 is associated with the same user, group of users, organization, service, device type, and/or physical location as electronic device 204. If the association does not exist, discovery apparatus 208 and/or communication apparatus 212 may omit generation and/or transmission of discovery response 220. Electronic devices 202-204 may thus reduce network traffic and/or processing associated with discovering service 226 by restricting the network traffic and/or processing to only that traffic and/or processing associated with electronic devices that offer service 226 and are associated with group ID 230.

Electronic devices 202-204 may additionally protect the confidentiality of group IDs 230-232 and/or the association of group IDs 230-232 with electronic devices 202-204 by encrypting and/or otherwise obscuring group IDs 230-232 in discovery request 218 and discovery response 220. Prior to transmitting discovery request 218, discovery apparatus 210 may encrypt group ID 230 by calculating a first hash value from group ID 230 (possibly with an added salt) using a first hash function. Discovery apparatus 210 and/or communication apparatus 214 may then include the first hash value as an encrypted representation of group ID 230 in discovery request 218. If a salt was added to group ID 230 prior to encrypting the group ID 230, discovery apparatus 210 and/or communication apparatus 214 may also include the salt, unencrypted, in discovery request 218. Discovery apparatus 210 and/or communication apparatus 214 may then and transmit discovery request 218 over network 102.

Upon receiving discovery request 218, discovery apparatus 208 may determine any association of electronic device 202 with the encrypted group ID 230 by obtaining a second group ID 232 associated with electronic device 202 and using the first hash function to calculate a hash value from group ID 232. If a salt is included in discovery request 218, discovery apparatus 208 may add the salt to group ID 232 prior to calculating the hash value. If the hash value matches the encrypted group ID 230 (e.g., the first hash value), discovery apparatus 208 may verify the association. If the hash value does not match the encrypted group ID 230, discovery apparatus 208 may verify a lack of the association.

If the association is verified, discovery apparatus 208 may encrypt group ID 232 by using a second hash function to calculate a second hash value from group ID 232 (possibly with an added salt). Discovery apparatus 208 and/or communication apparatus 212 may include the second hash value as an encrypted representation of group ID 232 in discovery response 220. If a salt was added to group ID 232 prior to encrypting the second group ID, discovery apparatus 208 and/or communication apparatus 212 may also include the salt, unencrypted, in discovery response 220. Discovery apparatus 208 and/or communication apparatus 212 may then transmit discovery response 220 over network 102 to electronic device 204.

After discovery response 220 is received by electronic device 204, discovery apparatus 210 may verify a match between group IDs 230-232 by applying the second hash function to group ID 230 to obtain a hash value and comparing the hash value to the encrypted group ID 232 in discovery response 220. Any salt added to group ID 232 prior to encryption and/or hash parameters for the second hash function may be extracted from discovery response 204. If the hash value matches the encrypted group ID 232, discovery apparatus 210 may verify the match and enable use of service 226 by application 224 and/or electronic device 204. If the hash value does not match the encrypted group ID 232, discovery apparatus 210 may determine that group IDs 230-232 do not match and omit service 226 and/or electronic device 202 from a list of discovered services matching discovery request 218.

To further secure transmission of group IDs 230-232, electronic devices 202-204 may vary the first and/or second hash values used to encrypt group IDs 230-232 in discovery request 218 and discovery response 220 based on uses of the hash function(s) by electronic devices 202-204. For example, electronic devices 202-204 may vary the first and/or second hash values and/or salts associated with the hash function(s) based on the number of times the hash function(s) have been used, timestamps associated with discovery request 218 and/or discovery response 220, and/or other properties associated with transmission and/or use of the hash function(s) and/or hash values.

Finally, electronic devices 202-204 may include functionality to manage discovery requests and/or discovery responses from other electronic devices that lack the ability to perform selective discovery of services using group IDs 230-232. For example, electronic devices 202-204 may implement a newer version of discovery protocol 234 that includes support for selective discovery of services, while the other electronic devices may implement an older version of discovery protocol 234 that lacks such support. As a result, the other electronic devices may transmit discovery requests and/or discovery responses that lack group IDs and respond to discovery requests even if the other electronic devices are not associated with group IDs in the discovery requests.

To facilitate backwards compatibility with the other electronic devices, electronic device 204 may provide discovery responses to discovery request 218 that do not include group IDs to application 224. Application 224 may determine the relevance of each discovery response to discovery request 218 and/or group ID 230 by examining other information included in the discovery response. For example, application 224 may determine an association of the electronic device from which the discovery response was received with group ID 230 based on a network address, username, device name, and/or other information in the discovery response.

Similarly, electronic device 202 may transmit discovery responses that specify group ID 232 for all discovery requests for service 226 that do not include group IDs. Because the electronic devices from which the discovery requests were transmitted may not understand the significance of group ID 232, the discovery responses may be validated by applications on the electronic devices using other information in the discovery responses. On the other hand, the discovery responses may also be multicast over network 102 and received by one or more electronic devices with the ability to utilize group ID 232 in service discovery. In turn, the electronic device(s) may filter use of service 226 and/or other services on electronic device 202 based on group ID 232 and/or other group IDs associated with electronic device 202 in the discovery responses. Service discovery between devices that include and/or lack the capability to understand group IDs is discussed in further detail below with respect to FIGS. 3-4.

Consequently, the system of FIG. 2 may reduce overhead associated with performing service discovery without compromising the identities of users, groups, and/or organizations associated with electronic devices 202-204. More specifically, the selective generation and transmission of discovery responses based on group IDs included in discovery requests may reduce network traffic and/or processing associated with performing service discovery among large numbers of electronic devices.

In addition, the use and/or varying of hash values and/or salts in encrypting group IDs in the discovery requests and responses may enable secure verification of common group IDs among a set of electronic devices without revealing the group IDs to electronic devices that are not associated with the group IDs. In other words, the system of FIG. 2 may provide private discovery of the electronic devices in a way that is anonymous (e.g., a third-party eavesdropper cannot tell who is performing the query), private (e.g., a third party eavesdropper cannot tell what is sought), and non-trackable (e.g., a third-party eavesdropper cannot tell if two queries are for the same service or for different services).

Those skilled in the art will appreciate that the system of FIG. 2 may be implemented in a variety of ways. First, discovery apparatuses 208-210 and communication apparatuses 212-214 on each electronic device 202-204 may be provided by the same software and/or hardware component, or discovery apparatuses 208-210 and communication apparatuses 212-214 may execute independently from one another. For example, discovery apparatuses 208-210 and communication apparatuses 212-214 may be implemented using different combinations of an application processor, a baseband processor, a multi-core processor, a single-core processor, an operating system kernel, a standalone application, and/or a driver.

Second, electronic devices 202-204 may use various techniques to perform service discovery and/or exchange group IDs 230-232. For example, electronic devices 202-204 may use a number of wired and/or wireless networking mechanisms to transmit discovery requests (e.g., discovery request 218) and discovery responses (e.g., discovery response 220) to one another. Along the same lines, electronic devices 202-204 may use a SHA-1 hash function to encrypt group IDs 230-232 and include group IDs 230-232 in NSEC3 records within the discovery requests and/or discovery responses to conform to the use of Domain Name System (DNS) by discovery protocol 234. Alternatively, electronic devices 202-204 may use other types of hash functions and/or data elements to provide group IDs 230-232 in the discovery requests and/or discovery responses. For example, electronic devices 202-204 may use symmetric-key cryptography, public-key cryptography, and/or other types of cryptographic techniques may be used to protect and verify group IDs 230-232 during transmission of discovery requests and/or discovery responses between electronic device 202-204.

Figure 3:
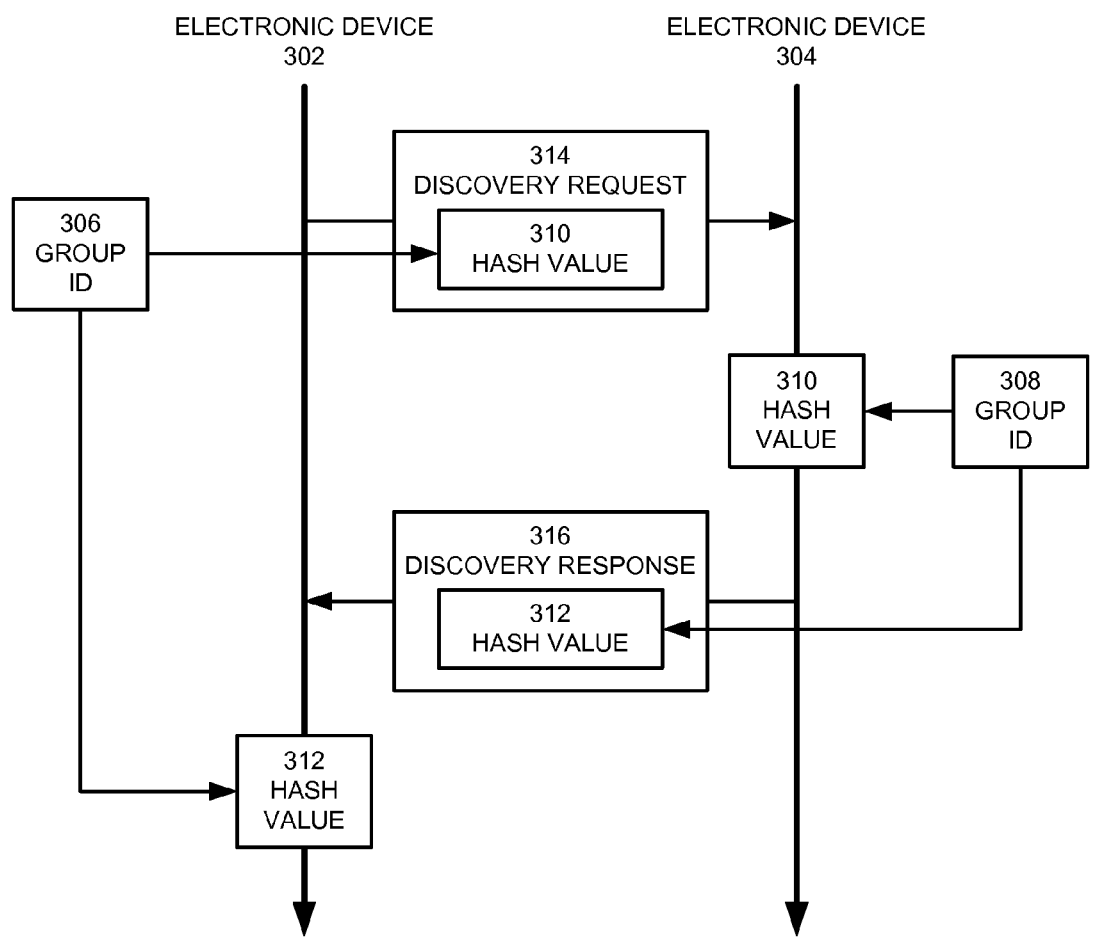
FIG. 3 shows an exemplary timeline of interaction between a set of electronic devices in accordance with the disclosed embodiments.

FIG. 3 shows an exemplary timeline of interaction between a set of electronic devices 302-304 in accordance with the disclosed embodiments. More specifically, FIG. 3 shows a timeline of service discovery operations between electronic devices 302-304 with the capability to use group IDs 306-308 associated with electronic devices 302-304 in performing service discovery. As shown in FIG. 3, electronic device 302 may include group ID 306 for electronic device 302 in a discovery request 314 as a first hash value 310 calculated from group ID 306 using a first hash function. Next, electronic device 302 may transmit discovery request 314 to electronic device 304 to discover services available on electronic device 304, if electronic device 304 is also associated with group ID 306 (e.g., the same user, group, and/or organization).

Upon receiving discovery request 314, electronic device 304 may use the first hash function to calculate the same hash value 310 from group ID 308 for electronic device 304, thus verifying the association of electronic device 304 with group ID 306. Because group IDs 306-308 match, electronic device 304 may generate a discovery response 316 to discovery request 314 and include a second hash value 312 calculated from group ID 308 using a second hash function in discovery response 316. Electronic device 304 may then transmit discovery response 316 to electronic device 302.

After electronic device 302 receives discovery response 316, electronic device 302 may verify the match between group IDs 306-308 by using the second hash function to calculate the second hash value 312 from group ID 306. After the match is verified, electronic device 302 may begin using a service associated with discovery request 314 and discovery response 316 on electronic device 304.

Figure 4:
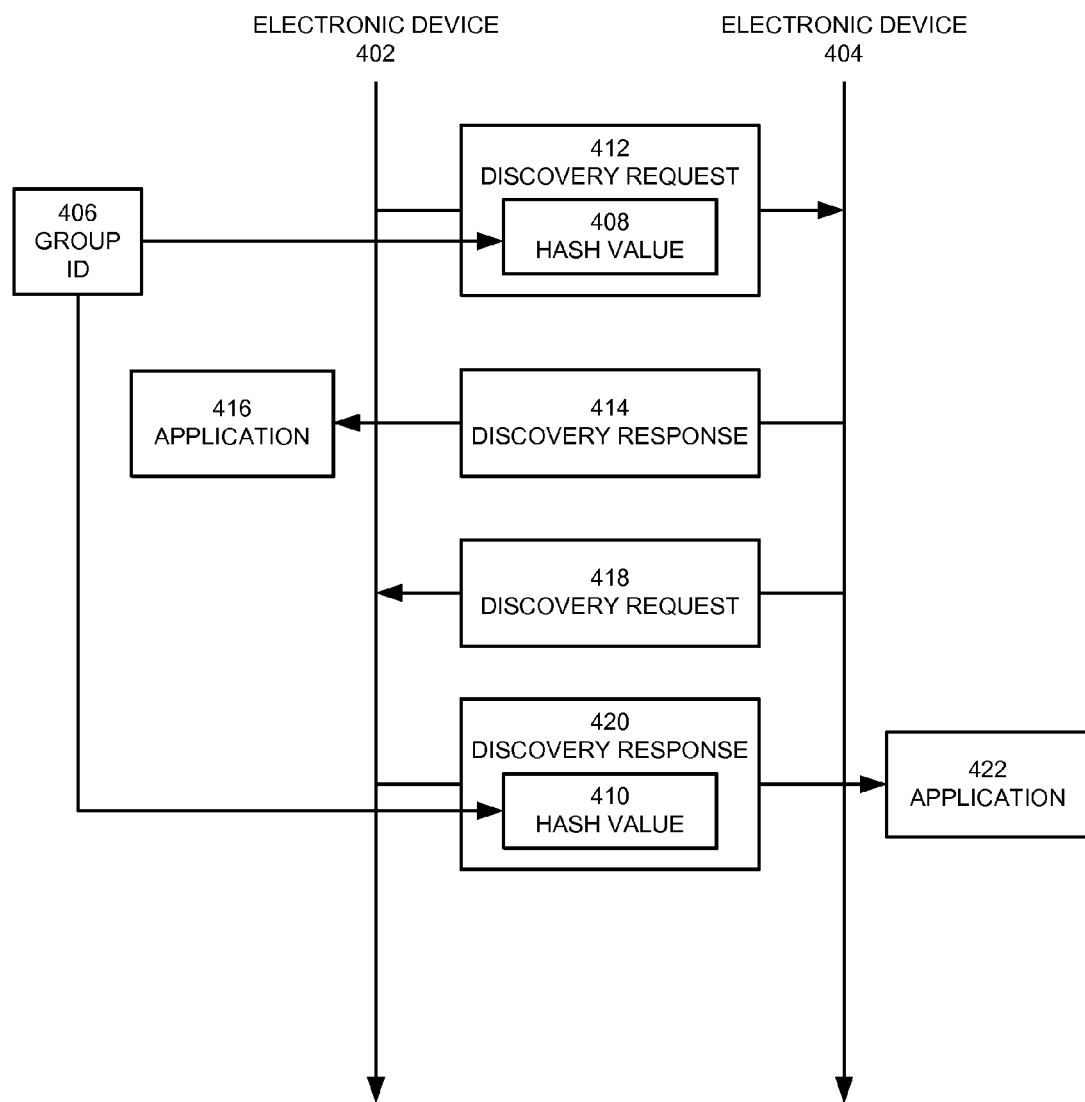
FIG. 4 shows an exemplary timeline of interaction between a set of electronic devices in accordance with the disclosed embodiments.

FIG. 4 shows an exemplary timeline of interaction between a set of electronic devices 402-404 in accordance with the disclosed embodiments. In particular, FIG. 4 shows a timeline of service discovery operations between a first electronic device 402 with the capability to use a group ID 406 in performing service discovery and a second electronic device 404 that lacks the capability to use group IDs in performing service discovery. As shown in FIG. 4, the service discovery operations may begin with the generation of a discovery request 412 by electronic device 402. As with electronic device 302 of FIG. 3, electronic device 402 may include group ID 406 for electronic device 402 in discovery request 412 as a hash value 408 calculated from group ID 406 using a first hash function. Once discovery request 412 is generated, electronic device 402 may transmit discovery request 412 to electronic device 404 to discover services available on electronic device 404.

Because electronic device 404 may lack the ability to perform service discovery using group IDs, electronic device 404 may ignore hash value 408 in discovery request 412. In turn, electronic device 404 may generate and transmit a discovery response 414 to electronic device 402 independently of group ID 406 and/or hash value 408. Discovery response 414 may then be validated by an application 416 on electronic device 402 to determine if discovery response 414 is relevant to discovery request 412 and/or group ID 406.

Electronic device 404 may also transmit a discovery request 418 to electronic device 402 to discover services available on electronic device 402. As with discovery response 414, discovery request 418 may lack a hash value of a group ID for electronic device 404. As a result, electronic device 402 may provide a discovery response 420 to discovery request 418 as long as electronic device 402 provides one or more services specified in discovery request 418. Electronic device 402 may additionally calculate a different hash value 410 from group ID 406 using a second hash function and include hash value 410 in discovery response 420. Hash value 410 may be ignored by electronic device 404, and an application 422 on electronic device 404 may be used to determine if discovery response 420 is relevant to discovery request 418.

Conversely, hash value 410 may be used by other electronic devices that receive discovery response 420 (e.g., through multicast transmission of discovery response 420) to update lists of available services on the other electronic devices. For example, the other electronic devices may include services on electronic device 402 in the lists if the other electronic devices are also associated with group ID 406 and/or the other electronic devices are discovering services independently of group IDs. On the other hand, the other electronic devices may omit services on electronic device 402 from the lists if the other electronic devices are not associated with group ID 406 and/or performing service discovery using other group IDs.

Figure 5:
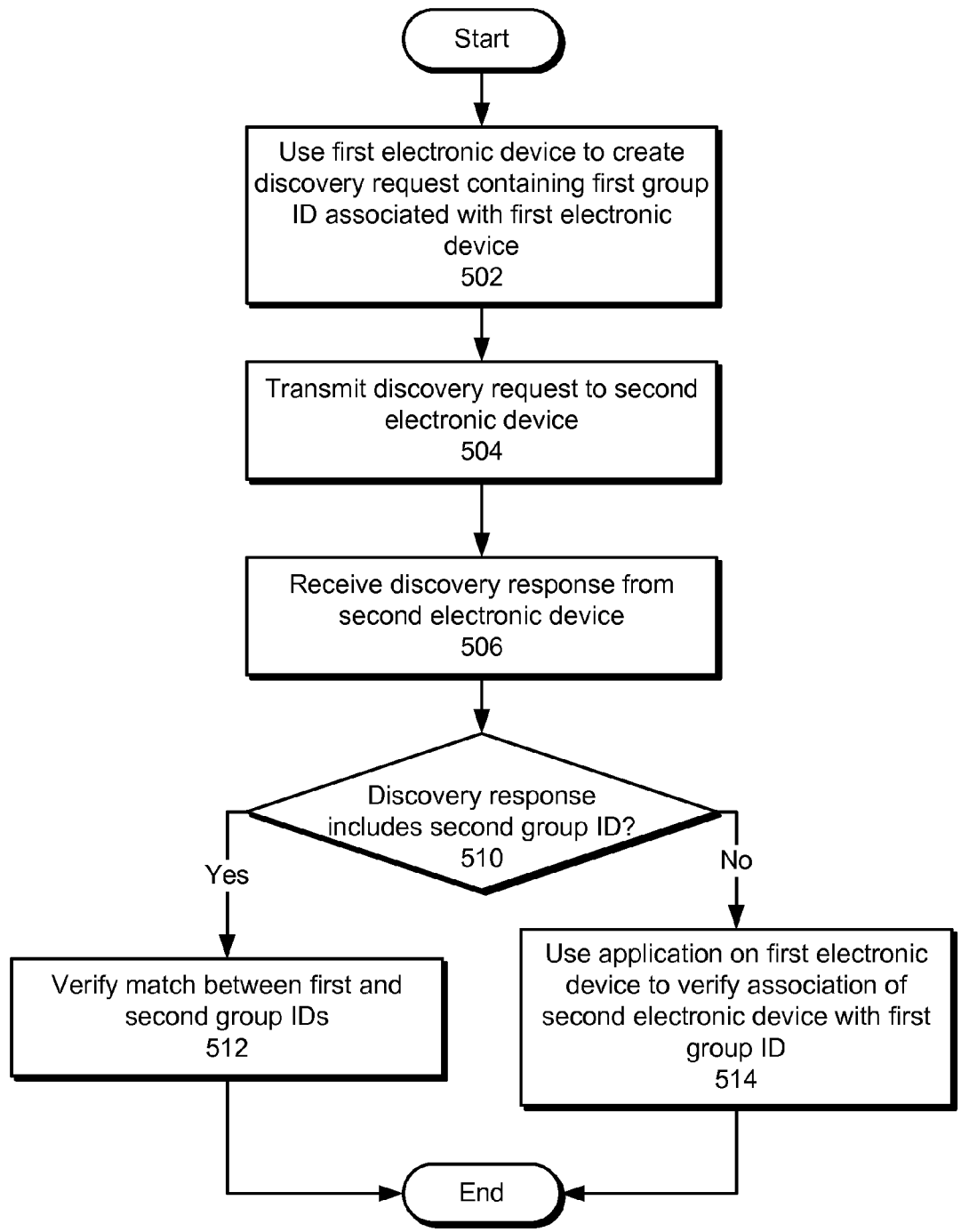
FIG. 5 shows a flowchart illustrating the process of facilitating communication with a second electronic device from a first electronic device in accordance with the disclosed embodiments.

FIG. 5 shows a flowchart illustrating the process of facilitating communication with a second electronic device from a first electronic device in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, the first electronic device is used to create a discovery request containing a first group ID associated with the first electronic device (operation 502). The first group ID may be encrypted within the discovery request to prevent unauthorized access to the first group ID. For example, the first group ID may be encrypted by calculating a first hash value from the first group ID (possibly with an added salt) using a first hash function. The first hash function may also be varied based on use of the first hash function by the first electronic device.

Next, the discovery request is transmitted to the second electronic device (operation 504), and a discovery response is received from the second electronic device (operation 506). The discovery response may then be processed based on the inclusion of a second group ID (operation 510) in the discovery response. If the discovery response includes the second group ID, a match between the first and second group IDs is verified (operation 512). If the second group ID is encrypted, the match is verified by calculating a second hash value from the first group ID using a second hash function and comparing the second hash value with the encrypted second group ID. If the second hash value matches the second group ID, the first and second group IDs match. If the second hash value does not match the second group ID, the first and second group IDs do not match.

If the discovery response does not include the second group ID, the second electronic device may not be capable of performing service discovery using group IDs. As a result, an application on the first electronic device is used to verify the association of the second electronic device with the first group ID (operation 514). For example, the application may use a network address, username, device name, and/or other information in the discovery response to determine if the discovery response is associated with the first group ID and/or otherwise relevant to the discovery request.

Figure 6:
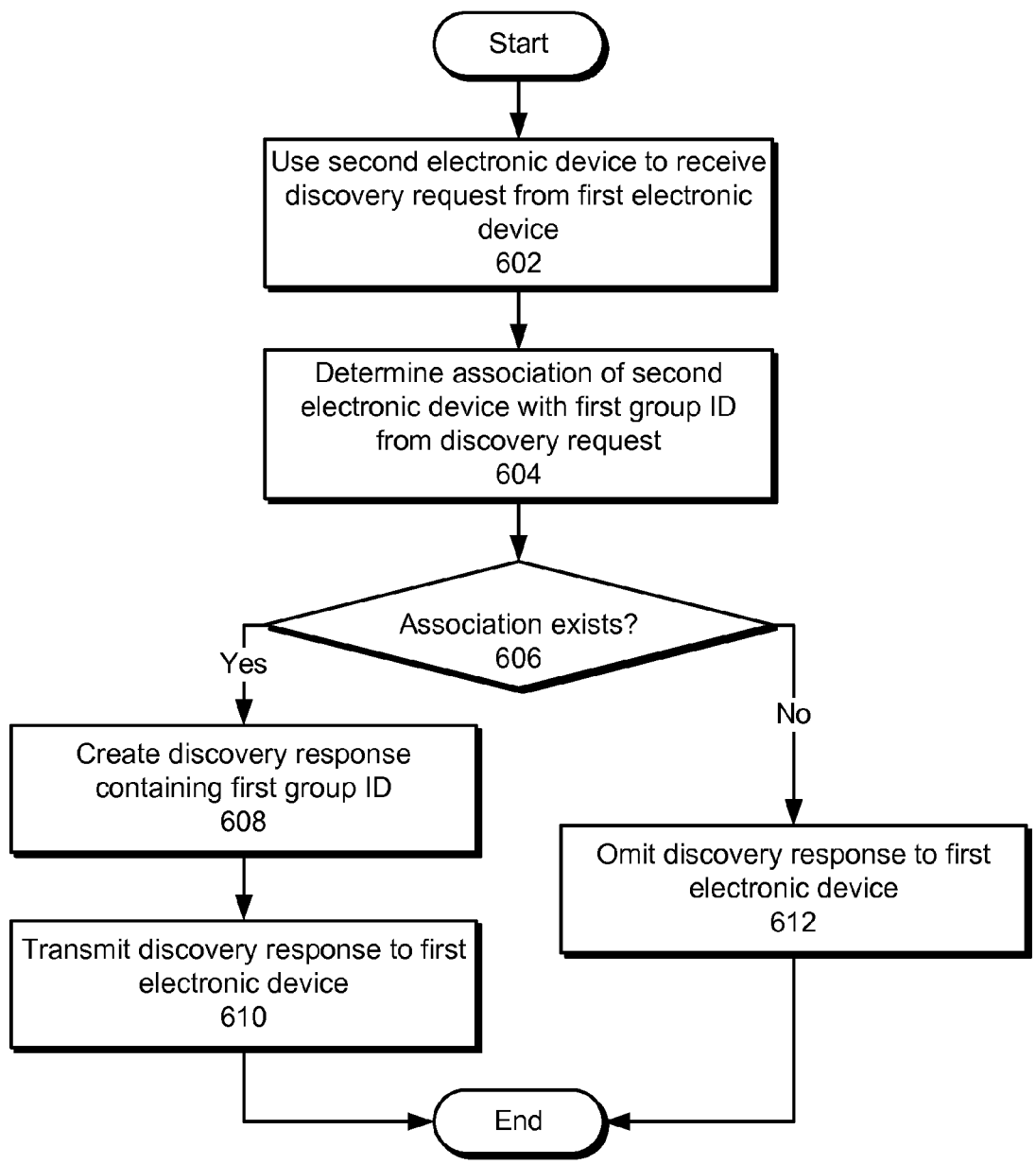
FIG. 6 shows a flowchart illustrating the process of facilitating communication with a first electronic device from a second electronic device in accordance with the disclosed embodiments.

FIG. 6 shows a flowchart illustrating the process of facilitating communication with a first electronic device from a second electronic device in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, the second electronic device is used to receive a discovery request from the first electronic device (operation 602). Next, an association of the second electronic device with a first group ID from the discovery request is determined (operation 604). If the first group ID is encrypted, the association is determined by obtaining a second group ID associated with the second electronic device and using a first hash function to calculate a first hash value from the second group ID. If the first hash value matches the encrypted first group ID, the association is verified. Conversely, if the first hash value does not match the encrypted first group ID, a lack of the association is verified.

The discovery request may then be processed based on the existence of the association (operation 606). If the association exists, a discovery response containing the first group ID is created (operation 608) and transmitted to the first electronic device (operation 610). To create the discovery response, a second hash function is used to calculate a second hash value from the second group ID, a salt may optionally be added to the second group ID, and the second hash value is included in the discovery response. If the association does not exist, a discovery response to the first electronic device is omitted (operation 612). Finally, if the discovery request does not include a group ID, the second group ID may be included in the discovery response, and the discovery response may be transmitted to the first electronic device and/or other electronic devices to facilitate discovery of services on the second electronic device by the first electronic device and/or other electronic devices.

Figure 7:
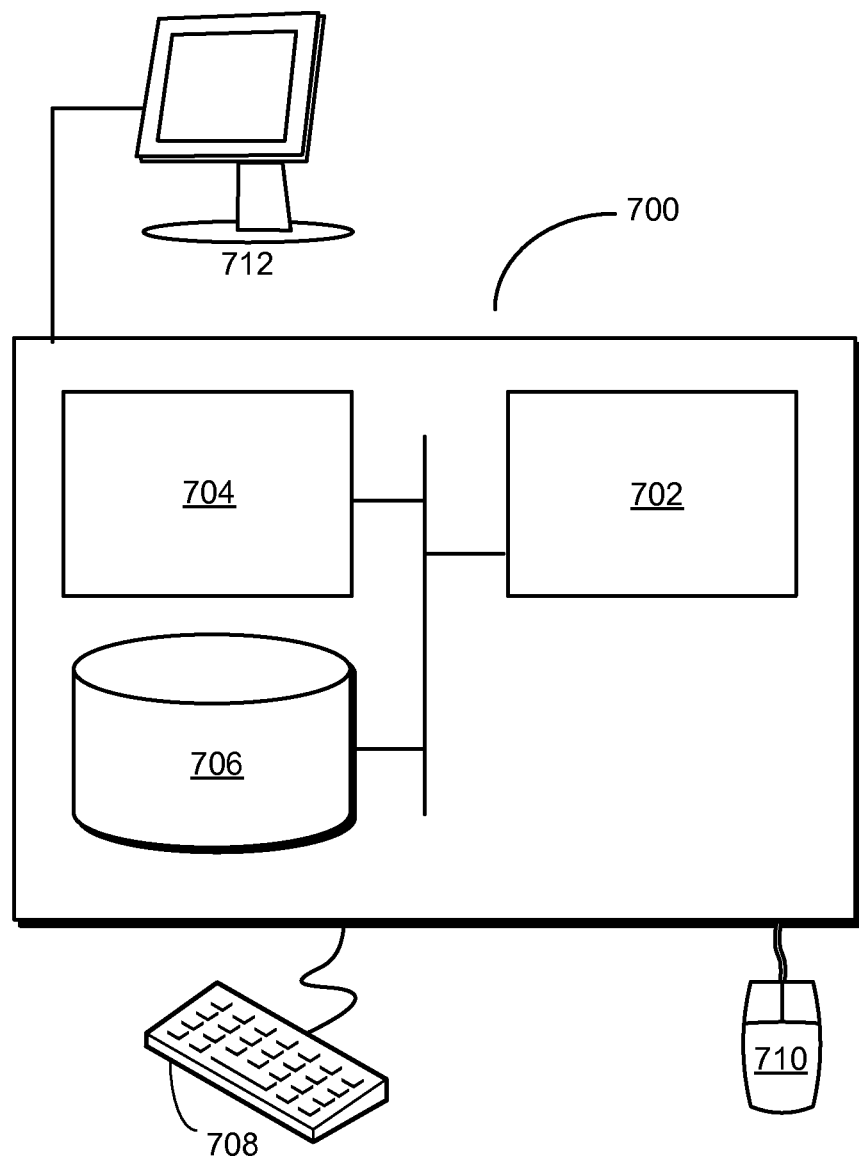
FIG. 7 shows a computer system in accordance with the disclosed embodiments.

FIG. 7 shows a computer system 700 in accordance with an embodiment. Computer system 700 may correspond to an apparatus that includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for facilitating communication between a first electronic device and a second electronic device. The system may include the first electronic device, which creates a discovery request containing a first group ID associated with the first electronic device and transmits the discovery request to the second electronic device. Next, the first electronic device may receive the discovery response from the second electronic device. If the discovery response includes a second group ID associated with the second electronic device, the first electronic device may verify a match between the first and second group IDs. On the other hand, if the discovery response omits the second group ID, the first electronic device may use an application on the first electronic device to verify an association of the second electronic device with the first group ID.

Alternatively, computer system 700 may implement the second electronic device. The second electronic device may receive the discovery request from the first electronic device and determine an association of the second electronic device with the first group ID from the discovery request. If the association exists, the second electronic device may create a discovery response containing the first group ID and transmit the discovery response to the first electronic device. If the association does not exist, the second electronic device may omit the discovery response.

In addition, one or more components of computer system 700 may be remotely located and connected to the other components over a network. Portions of the present embodiments (e.g., discovery apparatus, communication apparatus, electronic devices, etc.) may also be located on different nodes of a distributed system that implements the embodiments. For example, the present embodiments may be implemented using a cloud computing system that obtains service information and group IDs from a set of remote electronic devices and uses the service information and group IDs to respond to discovery requests from the remote electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method comprising:
    creating a discovery request comprising:
        encrypting a first group identifier (ID), wherein the first group ID is associated with at least a first electronic device: and
        including at least the encrypted first group II) in the discovery request; transmitting the discovery request;
    receiving a discovery response from a second electronic device;
    determining that when the discovery response comprises a second group ID;
    verifying that the second group ID is associated with the first group ID; and
    in response to the discovery response not including the second group ID, using an application on the first electronic device to verify that the second electronic device is associated with at least the first group ID.

2. The computer-implemented method of claim 1, wherein the first group ID and the second group ID are associated with an entity.

3. The computer-implemented method of claim 1, wherein the encrypting the first group ID comprises:
    adding a salt to the first group ID; or
    using a first hash function to calculate a first hash value from the first group ID.

4. The computer-implemented method of claim 3, further comprising:
    varying the first hash value based at least in part on a number of times the first hash function has been used by the first electronic device.

5. The computer-implemented method of claim 1, wherein the verifying comprises:
    using a second hash function to calculate a second hash value from the first group ID; and
    comparing the second hash value with the second group ID wherein the second group ID is encrypted.

6. The computer-implemented method of claim 1, wherein the first group ID comprises:
    a network address, a device name, a physical location, a device type, a service, an email address or an organization ID.

7. The computer-implemented method of claim 1, further comprising:
    using a service associated with the discovery response on the second electronic device.

8. The computer-implemented method of claim 7, wherein the service comprises a file transfer service, a streaming media service, a document collaboration service, a printing service, or a desktop sharing service.

9. The computer-implemented method of claim 3, further comprising:
    varying the first hash value based at least in part on a time stamp associated with the discovery request or a time stamp associated with the discovery response.

10. An electronic device, comprising:
    a memory; and
    a processor coupled to the memory, wherein the processor is configured to:
        create a discovery request comprising a first group identifier (ID) associated with the electronic device;
        transmit the discovery request;

receive a discovery response from another electronic device:

determine that the discovery response comprises a second group ID;

verify that the second group ID is associated with the first group ID; and in response to the discovery response not including the second group ID, use an application on the electronic device to verify that the another electronic device is associated with at least the first group ID.

11. The electronic device of claim 10, wherein the first group ID and the second group ID are associated with an entity.

12. The electronic device of claim 10, wherein the processor is further configured to encrypt the first group ID, wherein, to encrypt, the processor is configured to:

add a salt to the first group ID; or use a first hash function to calculate a first hash value from the first, group ID.

13. The electronic device of claim 12, wherein the processor is further configured to:

vary the first hash value based at least in part on a number of times the first hash function has been used by the electronic device.

14. The electronic device of claim 12, wherein to verify, the processor is configured to:

use a second hash function to calculate a second hash value from the first group ID; and compare the second hash value with the second group ID, wherein the second group ID is encrypted.

15. The electronic device of claim 10, wherein the first group ID comprises:

a network address, a device name, a physical location, device type, a service, an email address, or an organization ID.

16. The electronic device of claim 10, wherein the processor is further configured to:

use a service associated with the discovery response on the another electronic device.

17. The electronic device of claim 16, wherein the service comprises a file transfer service, a streaming media service, a document collaboration service, a printing service, or a desktop sharing service.

18. The electronic device of claim 12, wherein the processor is further configured to:

vary the first hash value based at least in part on: a time stamp associated with the discovery request or a time stamp associated with the discovery response.

19. A non-transitory computer-readable medium having instructions stored therein, which when executed by a computer cause the computer to perform operations, the operations comprising:

creating a first hash value based at least in part on a first group identifier (ID) associated with at least an electronic device:

including at least the first hash value in a discovery request;

transmitting the discovery request;

receiving a discovery response from another electronic device;

determining that the discovery response comprises a second group ID;

verifying that the second group ID is associated with the first group ID; and in response to the discovery response not including the second group ID, using an application on the first electronic device to verify that the second electronic device is associated with at least the first group ID.

20. The non-transitory computer-readable medium of claim 19, wherein the first group ID and the second group ID are associated with an entity.

21. The non-transitory computer-readable medium of claim 19, wherein, the creating the first hash value the operation comprises:

adding a salt to the first group ID.

22. The non-transitory computer-readable medium of claim 19, wherein the operations further comprise:

varying the first hash value based at least in part on a number of times the first hash function has been used by the electronic device.

23. The non-transitory computer-readable medium of claim 19, wherein, the verifying operation comprises:

using a second hash function to calculate a second hash value from the first group ID; and comparing the second hash value with the second group ID, wherein the second group ID is encrypted.

24. The non-transitory computer-readable medium of claim 19, wherein the first group ID comprises:

a network address, a device name, a physical location, a device type, a service, an email address, or an organization ID.

25. The non-transitory computer-readable medium of claim 19, further comprising:

using a service associated with the discovery response on the another electronic device.

26. The non-transitory computer-readable medium of claim 25, wherein the service comprises a file transfer service, a streaming media service, a document collaboration service, a printing service, or a desktop sharing service.

27. The non-transitory computer-readable medium of claim 19, further comprising:

varying the first hash value based at least in part on a time stamp associated with the discovery request or a time stamp associated with the discovery response.

\* \* \* \* \*